United States Patent

[11] 3,611,011

[72] Inventor Louis J. Postula
R. F. D. #3 Partello Road, Marshall, Mich. 49068
[21] Appl. No. 876,761
[22] Filed Nov. 14, 1969
[45] Patented Oct. 5, 1971

[54] AUTOMATIC HEADLIGHT SHUTOFF SYSTEM
13 Claims, 10 Drawing Figs.
[52] U.S. Cl. .................................................... 315/84, 180/111, 307/10
[51] Int. Cl. ..................................................... B60q 1/00
[50] Field of Search .......................................... 180/111, 112, 113; 315/76, 77, 82, 84; 335/205

[56] References Cited
UNITED STATES PATENTS
3,467,831 9/1969 Wilson et al. ................. 315/84 X Primary Examiner—Raymond F. Hossfeld
Attorneys—Roy A. Plant and William W. DeWitt ABSTRACT: A switch having an actuator which is releasably latched against a door of the vehicle having headlights, et cetera, and a spring for biasing the actuator away from the door to open the switch and deenergize the headlight circuit. One embodiment utilizes a magnetic latch on the door itself, while the other utilizes a latch housed with the switch, with a spring causing the latch to be biased toward the door and away from the switch actuator. Still another embodiment utilizes a switch with door movable actuator for controlling headlight operation, and which is connected in parallel to the ordinary headlight switch leaving the latter to be operated as usual, if desired, or turned off to allow the second switch with door movable actuator to turnoff the lights when the door is opened. The actuator can be moved against its spring bias either manually or by a solenoid to close the switch and energize the headlights.

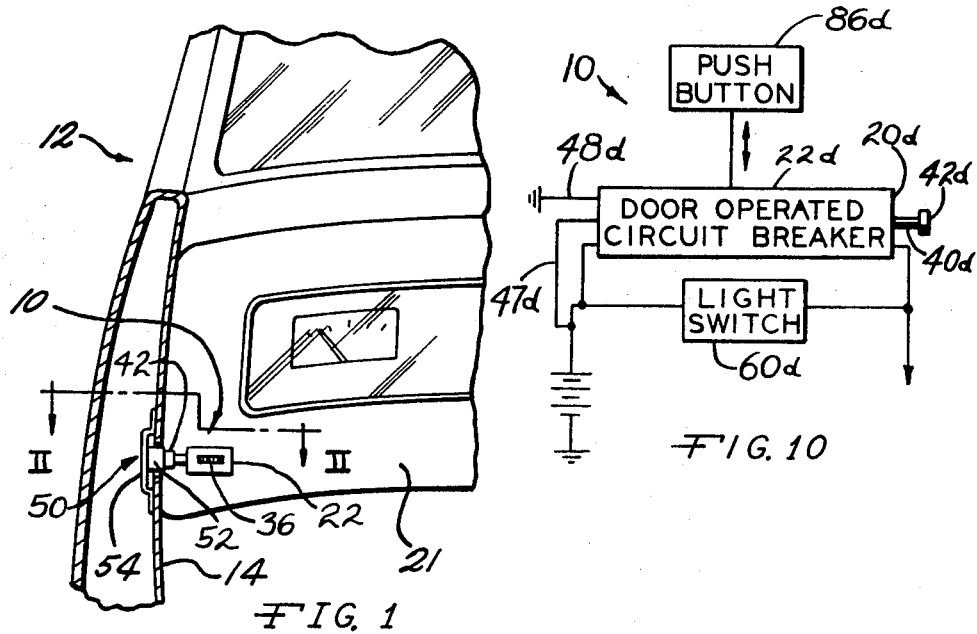
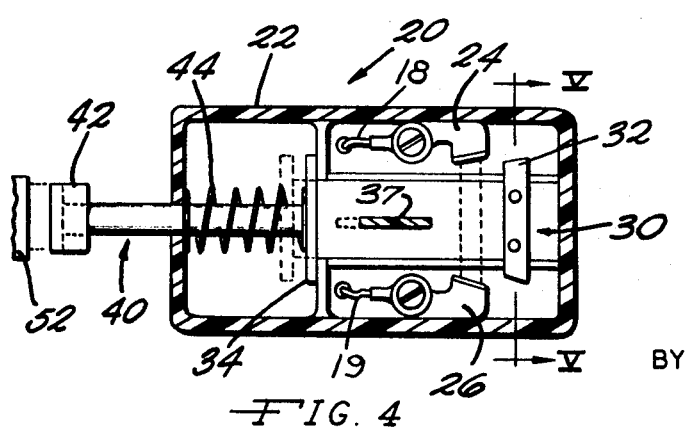

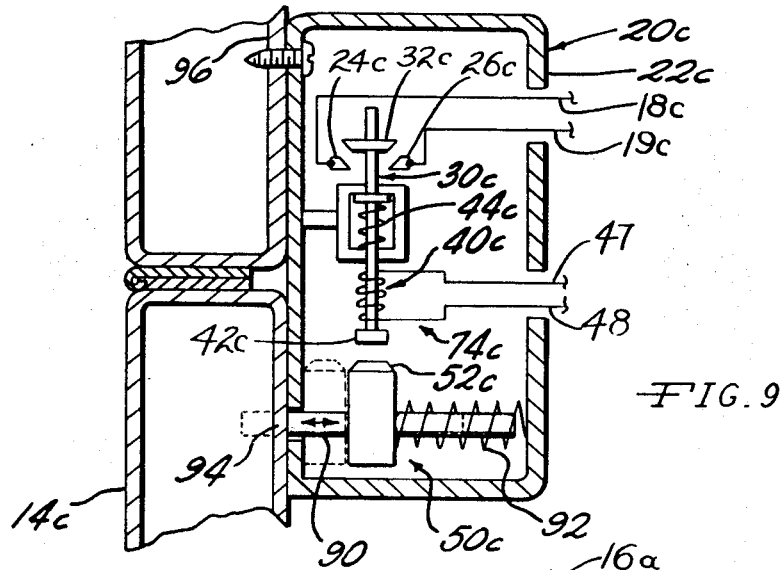
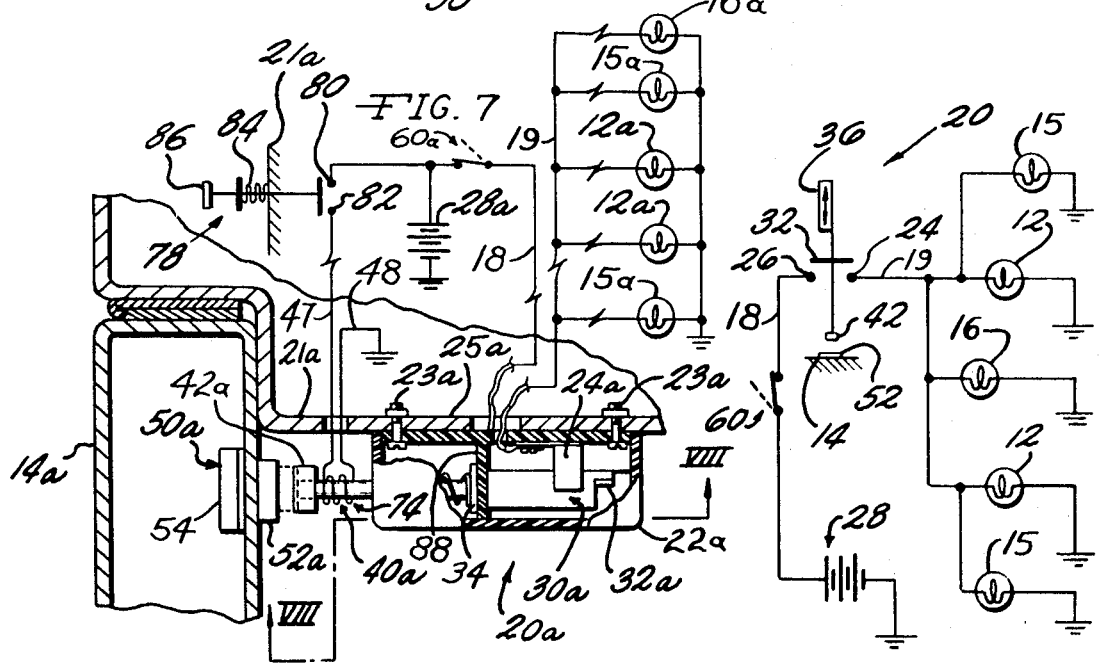
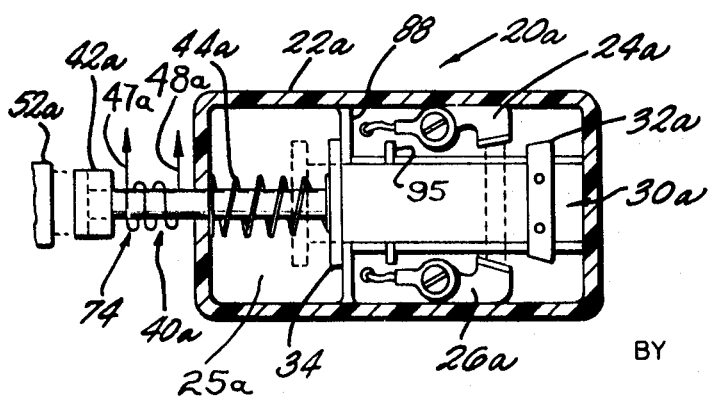

AUTOMATIC HEADLIGHT SHUTOFF SYSTEM

BACKGROUND OF THE INVENTION

A common problem with vehicles such as automobiles is that headlights turned on for safety during daytime conditions, such as involving heavy rain or fog, are often left on by accident when the car is parked and the ignition is turned off. The result is that unless discovered in time the battery is discharged and the car cannot be started again. A variety of devices have been developed in an attempt to overcome this problem, such as reminder buzzers, time delay light switches, and the like. However, these devices are usually relatively complicated and, therefore, overly expensive. Some of these require a relay operated from the ignition switch which is continuously energized while driving with the headlights on; this, of course, presents a considerable load on the generator system and the ignition switch itself which in many cases is undesirable. An example of the latter type of system is set forth in U.S. Pat. No. 3,145,322. Furthermore, headlight control systems operating in response to turning of the ignition switch or circuit might not allow headlight operation when the ignition is off, and this would be an undesirable restriction.

SUMMARY OF THE INVENTION

This invention relates to an automatic shutoff system for opening the headlight circuit Also, an automobile or other like vehicle, the system relying on the opening of the driver's door to automatically open the circuit and leave it open until intentionally reset. Specifically, the invention provides an automatic headlight shutoff system for a vehicle having doors and a headlight circuit, the system comprising a switch in the headlight circuit normally mounted adjacent the vehicle door on the driver's side, the switch in some cases including an outwardly extended, door-operated actuator mounted on same, and in other cases a separate actuator which is not operated to close the light circuit by closing the door, means for latching the actuator when the door is closed, means for biasing the actuator away from the latching means, and means for moving the actuator toward the latching means against the biasing means. Also, means are included for limiting movement of the actuator when the door is open.

Accordingly, it is an object of the invention to provide an automatic headlight shutoff system which opens the headlight including electric circuit when the driver's door is opened with the lights in operation.

It is another object of the invention to provide a system of the above character which may be readily installed on a vehicle either during or after its initial manufacture without requiring extensive modification of existing circuitry or structure, as well as to provide such a system which is itself inexpensive to manufacture.

A further object is to provide an automatic headlight shutoff system, which may be independently operated without interfering with the normal operation of the conventional headlight operation circuitry.

Still further objects and advantages of the invention will become apparent upon reference to the following drawings and detailed discussion.

To the accomplishment of the foregoing and related ends, other objects of the invention, then, consist of the means and circuitry hereinafter fully described and particularly pointed out in the claims, the annexed drawings and the following description setting forth in detail certain means for carrying out the objects of the invention, such disclosed means and embodiments of the invention illustrating, however, but several of the various ways in which the principle of the invention may be used.

BRIEF DESCRIPTION OF THE DRAWINGS

In the annexed drawings:

FIG. 1 is a fragmentary sectional view in elevation showing one way of positioning the electric switch of the invention in a vehicle such as an automobile, for carrying out the present invention.

FIG. 2 is an enlarged fragmentary sectional view as taken generally along the plane II—II of FIG. 1, looking in the direction of the arrows.

FIG. 3 is a further enlarged fragmentary sectional view taken along the plane III—III of FIG. 2.

FIG. 4 is a further enlarged fragmentary sectional view taken along the plane IV—IV of FIG. 2, looking in the direction of the arrows.

FIG. 5 is a fragmentary sectional view taken along the plane V—V of FIG. 4, looking in the direction of the arrows.

FIG. 6 is a schematic circuit diagram of the electrical system utilized in the invention shown in FIGS. 1 to 5, inclusive.

FIG. 7 is a fragmentary sectional, partially schematic view similar to FIG. 6, but illustrating an alternate embodiment including circuitry with a solenoid for operatively moving the actuator of the invention to a position so that opening the door will open the light circuit.

FIG. 8 is an enlarged fragmentary sectional view taken along the plane VIII—VIII of FIG. 7, looking in the direction of the arrows.

FIG. 9 is a partially schematic sectional view similar to that shown in FIGS. 7 and 8, but illustrating still another embodiment of the invention utilizing similar circuitry to that of FIG. 7.

FIG. 10 diagrammatically shows a modified construction wherein the operating means and circuitry of the invention is connected to bypass and leave operative the normal light switch of the automobile, mounted on its instrument panel, so that when this light switch is left unoperated, the operated switch and circuitry of the present invention will take over and cause the lights to be automatically turned off when the door on the driver's side is opened.

DESCRIPTION OF THE PREFERRED EMBODIMENTS

This invention relates to an automatic headlight shutoff system 10 usable in a vehicle such as an automobile 12 (FIG. 1), the system functioning when in operation to automatically turnoff the headlights when the door 14 on the driver's side is opened, and to hold the headlights off until the system is intentionally reactivated following the closing of such door.

In accordance with one aspect of the invention, as shown in FIGS. 1 to 6, a switch 20 is positioned adjacent the door 14 by mounting the switch, such as by small bolts or screws 23, for example, on the instrument panel 21. The switch 20 has an extending actuator member 40 which is latched by means 50 mounted on the door 14, the latch means 50 being operative to hold the actuator member 40 only when the door is closed, as shown in FIGS. 1 and 2.

Referring now to the details of the switch 20, FIGS. 2, 3 and 4, a housing 22, preferably of insulating plastic, encloses a pair of terminals 24 and 26, mounted on an insulating base 25, and which are connected by means of wires 18 and 19 in series, FIG. 6, between the battery 28 of the vehicle and the headlights 12 and taillights 15 (also dashlight 16, if desired). A slidable member 30 is mounted for sliding movement within the housing 22, the slide having at one end a contact blade 32 positioned normally to be out of contact with the button 24 and 26, FIG. 4, and at the other end a stop plate 34 at which end the slide 30 is connected to the actuator member or extension 40. To move the slide 30 so as to bring the extension 40 with its head 42 into latching engagement with the latch means 50 on the door 14, and so as to simultaneously move the contact blade 32 into electrical contact with terminals 24 and 26, a manually operated button 36, FIG. 2, is conventionally mounted on the outside of the housing 22 by a connector bar 37 attached to the slide 30. To prevent the slide 30 and the extension 40 from moving beyond the position in which the contact blade 32 touches the terminals and the extension 40 is in contact with the latch 50, a slot 38 is formed in the housing 22 and terminates at a point 39 which acts as an abutment for the bar 37 to limit the motion of the bottom 36 and, thus, of the slide 30 and its associated elements to the operable range of the assembly.

The actuator member 40 is preferably in the form of a rodlike member which may be formed from any suitable material and has a ferromagnetic head 42 designed to contact the latch means 50. To bias the extension 40 and the slide 30 attached thereto away from the latch means 50, a spring 44 is telescoped over the actuator member 40 to bear against a wall of the housing 22 at one end and against the movable stop plate 34 at the other end. The latching means 50 comprises a permanent magnet 52 which is mounted on the door 14, as by means of a plate 54 conventionally attached to the inside face of the door, or by other suitable means such as an adhesive applied directly to the face of the door. The magnet 52 is positioned so as to be in substantially direct alignment with the actuator member 40, in order to latch onto the latter when it is displaced outwardly so that its head 42 will contact the magnet 52. It will be readily appreciated that the field strength of the magnet 52 should be sufficient to enable the magnetic attraction of the head 42 to fully overcome the biasing of the spring 44.

FIG. 6 schematically illustrates, in conjunction with the previous FIGS. 1 to 5, the electrical operation of the embodiment just described. The shifting of the button 36 to the left, as shown in FIGS. 1 and 2, causes the head 42 to contact the magnet 52 on the door 14 when the door is in a closed position, and at the same time causes the contact blade 32 to close the electrical circuit between the terminals 24 and 26, thereby completing the electrical circuit between the battery 28 and the headlights 12, taillights 15 and dashlight 16. As an option, the conventional manual light switch 60 may be included in the circuitry, as shown in FIG. 6, particularly if the device of the invention is added to a previously wired vehicle. Thus, the switch 60 would represent the conventional light switch which could be utilized to choose between full headlights, dimmed lights, or the parking lights, and which in the FIG. 6 circuit would be placed in the "on" or closed position and switch 20 would be actuated in conjunction with same to operate the light system.

The automatic turnoff feature of the FIG. 6 circuit goes into operation when the door 14, FIG. 2, is opened, inasmuch as this pulls the magnet 52 away from the head 42 of the extending end of switch actuator 40, thus allowing the spring 44 to return the slide 30 to the open circuit position with contact blade 32 disengaged from terminals 24 and 26, thus causing the headlights and associated taillights and dashlight to automatically extinguish.

FIGS. 7 and 8 illustrate an alternate embodiment of the invention, wherein a remotely controllable means, such as a solenoid 74, is utilized to move the actuator member, which closes the switch, into contact with the latching means. Parts similar to those described in the previous embodiments bear the same reference numeral, to which a distinguishing suffix "a" has been added. Thus, switch 20a includes a housing 22a mounted on the instrument panel 21a by conventional means such as screws 23a, switch 20a having terminals 24a and 26a which, in the position shown in FIG. 8, open the circuit from the battery to the headlights, taillights, and dashlight. A slide 30a has, as before, a contact blade 32a at one end and at the other end an actuator member 40a. The head 42a of the latter member 40a is comprised of a ferromagnetic material; in fact, both 40a and 42a would be of ferromagnetic material where the solenoid 74 is located as shown. A spring 44a biases the extending portion of actuator member 40a and the slide 30a away from the automobile door 14a toward the right-hand end of the switch housing 22a, and the head 42a is magnetically attracted and latched by a magnet 52a mounted on the door of the vehicle, as before. Unlike the previous embodiment, the extending end portion of actuator 40a comprises an armature, there being a coiled winding about it (which, if desired, may be enclosed within the switch housing 22a) forming a solenoid 74 which is wired in parallel with the battery and light circuit, as shown in FIG. 7. To activate the solenoid 74, a manual pushbutton or like switch 78, FIG. 7, is mounted at a convenient location (which, for instance, may be within a portion of the switch housing or on the instrument panel), the terminals 80 and 82 of which open and close the solenoid circuit. To bias the switch 78 so as to be normally open, a spring 84 is mounted between the pushbutton 86 of the switch and the wall of the panel 21a, which may be the automobile instrument panel. When the car door 14a is closed, FIG. 7, it will be readily appreciated that depressing the pushbutton 86 of switch 78 will momentarily energize the solenoid 74 so that the extending end portion of actuator 40a of the switch 20a is projected outwardly, whereupon the magnet 52a will latch the head 42a, thus holding the contact blade 32a, FIG. 8, across the terminals 24a and 26a thus closing the electric light circuit. Since the operation of switch 78 is only momentary, the solenoid 74 is only energized for a moment. However, once the solenoid has moved the switch actuator member 40a outwardly and into contact with the magnet 52a, the solenoid has done its work and is no longer needed for the time being. Consequently, its subsequent deenergization resulting from the momentary operation of switch 78 does not affect the operation of switch 20a, which is magnetically latched in a closed-circuit condition. As in the previous embodiment, when the door 14a is opened, the magnet 52a is pulled away from the head 42a, whereupon the spring 44a immediately retracts the slidable member 30a and the actuator member 40a to the position at which the contact blade 32a opens the circuit between terminals 24a and 26a. The open circuit causes the headlights 12a, taillights 15a and dashlight 16a to automatically turn off.

Because no manual button is utilized to move the switch actuator member 40a with its head 42a into latching engagement with latch 50a, a different structure than that of the previous embodiment is utilized to prevent the extending portion of actuator member 40a from following the door 14a when it is opened (if the switch is of knife contact type). In this case, a bar 95, FIG. 8, may be mounted on the slide 30a so as to abut the housing partition 88 when the switch 20a is closed, preventing further outward movement of actuator member 42a should contact blade 32a in combination with terminals 24a and 26a be of a form not also acting as a stop for 42a.

FIG. 9 diagrammatically illustrates still another embodiment of the invention, in which the latching mechanism is not mounted on the door but is instead mounted within the housing of the switch. Parts similar to parts previously described bear the same reference numerals, to which the distinguishing suffix "c" has been added. Thus, the latching mechanism 50c is mounted in the housing 22c of the switch 20c, the slide 30c, the actuator member 40c, and the solenoid 74c being basically the same as those disclosed in FIGS. 7 and 8. Also, the latch 50c utilizes a magnet 52c which, when contacted by the ferromagnetic head 42c of actuator member 40c, holds the switch closed. Unlike the previous embodiments, however, latch 50c is mounted on a slidable rod 90 which is conventionally supported for nonrotatable reciprocation back and forth within the switch housing 22c under conditions of use. To bias the latch 50c and the rod 90 away from the end of actuator member 40c and toward the door 14c, a spring 92 is compressed between the latching mechanism 50c and the housing 22c as shown. The rod 90 has an end 94 which contacts the side of door 14c when the door is closed, thereby aligning the latching mechanism 50c with the end of actuator member 40c. Like the previous embodiment, the switch 20c in this embodiment is remotely actuable, and it may therefore be mounted generally out of sight, for example, on the firewall or automobile body wall 96 of the vehicle, rather than on the instrument panel.

The operation of the embodiment shown in FIG. 9 is similar to that shown in FIGS. 7 and 8, in that actuation of the solenoid 74c moves the switch slide and actuator member 40c outwardly against the bias of the spring 44c and into a magnetic latching arrangement, wherein the switch contacts 24c and 26c are closed. This is maintained by the magnetic latch until the door 14c is opened, whereupon the spring 92 causes the latching mechanism 50c to move away from the head 42c of actuator 40c, thereby breaking the magnetic contact with the head 42c of actuator 40c and allowing the spring 44c to return the the latter to the open circuit position, thereby turning off the lights, and leaving the lighting circuit open even when the door 14c is again closed.

FIG. 10 diagrammatically illustrates another embodiment of the invention wherein the automobile lights may be operated in conventional manner, with the present improvement being separately operable to bypass the light switch 60d and operate the automobile lights independently when switch 60d is in "off" position.

Referring more particularly to FIG. 10, it will be noted that there is a door operated circuit breaker or switch 20d, having an actuator button 86d corresponding in use to slide button 36 of FIG. 2, or pushbutton 86 of FIG. 7. The operation of actuator button 86d, closes the light circuit as described in connection with the combinations illustrated in FIGS. 2, 7 and 9, so that opening of the door 14d adjacent the driver will automatically open the light circuit and turn off the lights. Where a solenoid is used as previously described, wires 47d and 48d are used to supply electric current for the operation of same when pushbutton 86d is depressed.

Although certain preferred embodiments of the invention have been disclosed, it will be readily appreciated that other equivalent structures can be utilized to obtain the same results. For example, the magnet 52 need not be a permanent magnet but can be an electromagnet. Furthermore, the latching mechanism 50 need not be a magnet at all, but could instead be a mechanical catch or the like which engages the head 42 when fully extended and the door closed, but which breaks away from the head when the door is opened, and it is intended that the showing in the drawings be considered to diagrammatically illustrate the alternate elements described in this paragraph. Consequently, the preferred embodiments disclosed herein are not to be regarded as showing the only possible forms of the invention, but instead as illustrating the concepts underlying it.

I therefore particularly point out and distinctly claim as my invention:

1. In combination with a motor vehicle having a door and an electrical system including a battery, at least one headlight, and a light switch connected in a circuit including said battery and said headlight, an automatic headlight turnoff system comprising: a switch having terminal means connected into the headlight circuit to open and close the same and having a movable actuator means; means for mounting said actuator means generally adjacent said door and movable with respect thereto; means for effectively latching said actuator means against said door when the latter is in a closed position; means for biasing said actuator means away from its said latched position when said door is opened; and means for moving said actuator means toward its said latched position against said biasing means.

2. The turnoff system as defined in claim 1, wherein said switch includes a housing portion and said actuator means includes a member extending outwardly of said housing.

3. The turnoff system as defined in claim 1, wherein said latching means includes a magnet and said actuator means carries a ferromagnetic portion to latch by magnetic attraction to said magnet.

4. The turnoff system as defined in claim 3, including means for mounting said magnet on said door.

5. The turnoff system as defined in claim 3, wherein said means for moving said actuator means includes a slide and a manually actuable handle member.

6. The turnoff system as defined in claim 5, wherein said switch includes a movable contact carried by said slide and positioned to close a circuit across said terminal means only when said actuator means is latched by said latching means.

7. The turnoff system as defined in claim 1, wherein said means for moving said actuator means includes a solenoid.

8. The turnoff system as defined in claim 7, wherein said actuator means comprises an armature for said solenoid.

9. The turnoff system as defined in claim 7, including a manually actuable electrical switch for energizing said solenoid and means for biasing said switch normally in the open circuit position.

10. The turnoff system as defined in claim 1, wherein said turnoff system includes a first movable member (50c) mounted for movement toward and away from said door, means for biasing the movement of such member, and a second movable member (40c), and wherein said latching means (52c) holds said members in a predetermined mutual position in which the first member contacts said door.

11. The turnoff system as defined in claim 10, wherein said latching means includes a magnet.

12. The turnoff system as defined in claim 11, wherein said magnet is carried by one of said movable members.

13. The turnoff system as defined in claim 10, wherein one of said movable members carries a movable contact comprising a part of said switch.

PO-1050
(5/69)

UNITED STATES PATENT OFFICE
CERTIFICATE OF CORRECTION

Patent No. 3,611,011          Dated October 5, 1971

Inventor(s) Louis J. Postula

It is certified that error appears in the above-identified patent and that said Letters Patent are hereby corrected as shown below:

Column 1, line 27, cancel "Also," and insert ---in---.
Column 2, line 59, cancel "button" and insert ---terminals---.

Signed and sealed this 4th day of April 1972.

(SEAL)
Attest:

EDWARD M. FLETCHER, JR.          ROBERT GOTTSCHALK
Attesting Officer          Commissioner of Patents